United States Patent

Schmidt (10) Patent No.: US 9,229,208 B2
(45) Date of Patent: Jan. 5, 2016

(54) ARRANGEMENT FOR GENERATING A DIFFERENTIAL INTERFERENCE CONTRAST IMAGE

(75) Inventor: Christine Schmidt, Berlin (DE)

(73) Assignee: HSEB Dresden GmbH, Dresden (DE)

( * ) Notice: Subject to any disclaimer, the term of this patent is extended or adjusted under 35 U.S.C. 154(b) by 0 days.

(21) Appl. No.: 14/123,048

(22) PCT Filed: Mar. 28, 2012

(86) PCT No.: PCT/EP2012/055532
§ 371 (c)(1),
(2), (4) Date: Nov. 27, 2013

(87) PCT Pub. No.: WO2012/163566
PCT Pub. Date: Dec. 6, 2012

(65) Prior Publication Data
US 2014/0098416 A1    Apr. 10, 2014

(30) Foreign Application Priority Data
May 27, 2011 (DE) .......................... 10 2011 050 674

(51) Int. Cl.
*G02B 21/06* (2006.01)
*G02B 21/14* (2006.01)

(52) U.S. Cl.
CPC ................ *G02B 21/06* (2013.01); *G02B 21/14* (2013.01)

(58) Field of Classification Search
CPC .......... G02B 5/28–5/289; G02B 21/02; G02B 21/06; G02B 21/08; G02B 21/086; G02B 21/14; G02B 27/50–27/52; G02B 21/0052–21/0056
USPC ................. 359/370, 385, 389, 577, 580, 581, 359/656–661; 356/450–521
See application file for complete search history.

(56) References Cited

U.S. PATENT DOCUMENTS 4,062,619 A * 12/1977 Hoffman ........................ 359/370
4,976,503 A * 12/1990 Woodard ........................ 359/360

(Continued)

FOREIGN PATENT DOCUMENTS

| JP | H06-289438 A | 10/1994 |
| JP | H07-005397 A | 1/1995 |
| JP | H08-502600 A | 3/1996 |
| JP | H10-268197 A | 10/1998 |

OTHER PUBLICATIONS

R.Danz, et al. PlasDIC—a useful modification of the differential interference contrast in Photonic, vol. 36, 1 (2004), S.42-45; 20 pages.

(Continued)

*Primary Examiner* — Stephone B Allen
*Assistant Examiner* — Adam W Booher
(74) *Attorney, Agent, or Firm* — Thorpe North & Western, LLP (57) ABSTRACT

An assembly for the generation of a differential interference contrast image (DIC) of an object in an imaging plane, comprising a radiation source; a Köhler illuminating optical assembly for illuminating the object with light from the radiation source; an objective for imaging the object plane in an imaging plane, wherein the objective is provided with an exit pupil and an entrance pupil, and wherein the entrance pupil of the objective is positioned in the illuminating pupil of the Köhler illuminating optical assembly; and a component for the generation of an interference is characterized in that the component for the generation of an interference is positioned in the exit pupil of the objective, and the component for the generation of an interference is formed by an amplitude filter with an amplitude transmission factor $F_{DIC}(x,y)$, which complies with the equation:

$$2 \cdot F_{DIC}(x, y) = F_+(x, y) \cdot e^{+iP_0} + F_-(x, y) =$$

$$2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein $F_{DIC}(x,y)$ is a functional expression for the description of the amplitude filter transmission and the phase of the amplitude filter depending on the coordinates x and y.

6 Claims, 4 Drawing Sheets

(56) References Cited

U.S. PATENT DOCUMENTS

| | | | |
|---|---|---|---|
| 5,708,526 A | 1/1998 | Stankewitz | |
| 6,873,733 B2 * | 3/2005 | Dowski, Jr. | 382/232 |
| 2002/0089741 A1 | 7/2002 | Kuhn | |
| 2002/0196980 A1 | 12/2002 | Dowski, Jr. | |

OTHER PUBLICATIONS

Wavefront Shear in Wollaston and Nomarski Prisms (http://www.olympusmicro.com/primer/java/dic/wollastonwavefronts/index.html); accessed Jul. 12, 2010; 5 pages.

* cited by examiner

ARRANGEMENT FOR GENERATING A DIFFERENTIAL INTERFERENCE CONTRAST IMAGE

TECHNICAL FIELD

The invention relates to an assembly for the generation of a differential interference contrast image (DIC) of an object in an imaging plane, comprising
(a) a radiation source;
(b) a Köhler illuminating optical assembly for illuminating the object with light from the radiation source;
(c) an objective for imaging the object plane in an imaging plane, wherein the objective is provided with an exit pupil and an entrance pupil, and wherein the entrance pupil of the objective is positioned in the illuminating pupil of the Köhler illuminating optical assembly; and
(d) a component for the generation of an interference.

The differential interference contrast microscopy (DIC) is a polarization contrast method which is used to display phase objects with a plastic impression. Phase objects are objects where phase differences are generated in the light path. With DIC microscopy the object is illuminated with a Köhler illumination assembly. A polarization filter, the polarizer, is inserted before the radiation source for the generation of polarized light. Another polarization filter, the analyzer, is arranged before the detector. With DIC microscopy a birefringent birefringent prism, the so-called Nomarski-prism, is provided in the illuminating light path optically behind the polarizer. A further, similar birefringent prism is provided optically before the analyzer. The used Nomarski-prisms have the same design. They consist of birefringent crystals. The polarized radiation bundle is split into two portions in the Nomarski-prism which have a different phase and polarization direction.

Two perpendicular polarized radiation paths are generated with the assembly. The radiation paths have the same amplitudes. They can interfere with each other after their combination. Phase objects where the two portions have a different optical path length due to, for example different thicknesses or different diffraction indices, effect an additional phase shift. This can be recognized in the image plane behind the analyzer in the form of a difference in brightness.

PRIOR ART

An assembly for DIC microscopy is known from the Internet at http://www.olympusmicro.com/primer/techniques/dic/dicintro.html, "Fundamental Concepts in DIC Microscopy" and http://www.olympusmicro.com/primer/java/dic/wollastonwavefronts/index.html, "Wavefront Shear in Wollaston and Nomarski Prisms" and R. Danz, et al. "Plas-DIC—a useful modification of the differential interference contrast" in Photonic, Vol. 36, 1 (2004), S.42-45. With the assembly the polarizer and the analyzer as well as the allocated Nomarski-prisms must be suitably orientated with respect to each other. For microscope objectives having different magnification fitted Nomarski-prisms must be used. It is known to laterally shift Nomarski-Prisms with respect to the microscope axis or to rotate the microscope axis.

With reflecting light microscopy the differential interference contrast can be achieved with one single Nomarski-prism in the common portion of the illumination and imaging radiation path. A pair of prisms is necessary for transmission microscopy.

The required optical and mechanical components are relatively expensive. The adjustment and synchronizing in a microscope and the installation is time consuming.

The intensity distribution of the image is proportional to the amplitude and phase properties of the object. Such proportionality depends on the respective shift of the images of the two portions of the radiation path and its direction. Furthermore, the proportionality depends on the interaction of the two differently polarized illuminating portions with the stress birefringence of the object. Thereby, the method is an essentially qualitative method. Contrary to the simple polarization contrast method DIC microscopy is, therefore, not suitable for stress birefringent objects.

Contrary to the phase contrast method the illumination method is in principle not limited with DIC microscopy. DIC enables the examination of samples having a thickness of much more than $\lambda/10$.

It is a disadvantage with phase contrast methods as well as with DIC that the light efficiency is low, typically only a few percent of the brightness of a bright field image. The main reason for the low efficiency is the necessity to use polarized light. In addition, DIC requires a low stress birefringence optical assembly in the radiation path between the polarizer in the illumination and the detector.

The term "Foucoult knife-edge test" designates a method where a knife-edge is positioned in the imaging plane to test optical instruments. According to this method an eye pupil and the knife-edge are practically positioned at the same place.

DISCLOSURE OF THE INVENTION

It is an object of the invention to provide an assembly of the above mentioned kind which is simple, has a high light throughput and is easily adjusted.

According to an aspect of the invention this object is achieved in that
(e) the component for the generation of an interference is positioned in the exit pupil of the objective, and
(f) the component for the generation of an interference is formed by an amplitude filter with an amplitude transmission factor $F_{DIC}(x,y)$, which complies with the equation:

$$2 \cdot F_{DIC}(x, y) = F_+(x, y) \cdot e^{+iP_0} + F_-(x, y) = 2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein
x,y: coordinates in the exit pupil plane
$F_{DIC}(x,y)$: functional expression for describing the amplitude filter transmission and the phase of the amplitude filter as a function of x and y
t(x,y): variable, portion of the amplitude transmission factor of the amplitude filter with $t(x, y) = T_0 \cdot \cos\left(P_{max}(-x \cdot \sin\varphi + y \cdot \cos\varphi) + \frac{P_0}{2}\right)$ T(x,y): Transmission degree of the amplitude filter. $F^*_{DIC}(x,y)$ designates the conjugate-complex of $F_{DIC}(x,y)$, then $$T(x,y) = F_{DIC}(x,y) \cdot F^*_{DIC}(x,y) = t^2(x,y)$$

$F_+(x,y)$: "positive" portion of $F_{DIC}$, with $F_+(x,y)= T_0 \cdot e^{+iP_{max}\cdot(-x\cdot\sin\phi+y\cdot\cos\phi)}$ φ: azimuth direction angle of the effect of the DIC in the exit pupil plane $P(x,y)$: phase distribution of the amplitude filter with $$P(x, y) = \arg(F_{DIC}) = \begin{cases} \dfrac{P_0}{2} & -\pi \le 2P_{max}\cdot(-x\cdot\sin\varphi+y\cdot\cos\varphi)+P_0 \le \pi \\ \dfrac{P_0}{2}+\pi & \pi \le 2P_{max}\cdot(-x\cdot\sin\varphi+y\cdot\cos\varphi)+P_0 \le 3\pi \end{cases}$$

$F_-(x,y)$: "negative" portion of $F_{DIC}$, with $$F_+(x,y)\cdot F_-(x,y) = T_0 \cdot e^{+iP_{max}\cdot(-x\cdot\sin\phi+y\cdot\cos\phi)} \cdot T_0 \cdot e^{-iP_{max}\cdot(-x\cdot\sin\phi+y\cdot\cos\phi)} = T_0^2$$

$P_0$: constant, real phase offset of the amplitude filter $F_{DIC}(x,y)$ $T_0$: constant, real amplitude transmission factor of $F_{DIC}$, or $F_+$ and $F_-$, resp.

$P_{max}$: constant, real maximum phase of $F_+$ or $F_-$, resp.

The phase distribution $P(x,y)$ within the exit pupil is a phase step with maximum two relevant values.

With the invention optical imaging chains can be modified where the aperture stop or pupil between the object and the image is physically accessible. The modification is effected with an additional component in the exit pupil of the objective. Thereby, features of the object which are normally invisible become visible and can be detected with a detector.

According to the present invention the additional component is an optical amplitude filter which generates the same optical effects as the differential interference contrast (DIC) microscopy. However, DIC specific components can be entirely omitted. It is not necessary to use polarized light. The present invention is, therefore, not a polarization contrast method. The assembly is insensitive to polarization. The imaging optical assembly must, therefore, only comply with easy requirements than known DIC microscopes. With transmitted light the assembly is essentially independent of the magnification and with certain embodiment entirely independent of the magnification. It is a special advantage of the invention that the assembly is easily upgraded with an amplitude filter and easily adjusted.

$F_{DIC}(x,y)$ is a functional expression for describing the amplitude filter transmission and the phase of the amplitude filter depending on the coordinates x and y. The distribution of the transmission degree of the amplitude filter in the x- and y-direction is described by the complex value $F_{DIC}(x,y)F^*_{DIC}(x,y)$.

φ is the azimuth direction angle of the effect of the DIC in the exit pupil plane. However, it can equally describe the azimuth direction angle in the image plane if the coordinate system described by x and y of the exit pupil is transferred to the image plane.

$P(x,y)$ represents the phase distribution of the amplitude filter, i.e. the distribution of the effect on the phase of the incident radiation. The phase is described by the complex argument of the filter, $P(x,y)=\arg(F_{DIC})$. The practical realization of such a phase can be effected by differences Δd of the thickness of the substrate of the amplitude filter. Such differences comply with the formula:

$$(n-1)\cdot\Delta d(x,y) = \frac{P(x,y)}{2\pi}\cdot\lambda$$

wherein λ is the wavelength of the light from the radiation source and n is the diffraction index of the filter substrate at wavelength λ. In an alternative modification of the invention the phase distribution is effected with a suitable coating of the filter substrate.

$P_0$ is a phase offset of the amplitude filter. The phase offset can be chosen at will. It will not have an effect on the image generation. The phase offset enables the use of an amplitude filter with a filter substrate thickness which can be well handled.

$T_0$ represents the amplitude transmission factor of the amplitude filter. It is a constant factor which is independent of the coordinates x and y in the exit pupil. In other words: $T_0$ represents the basic transmission of the filter substrate.

The use of an amplitude filter with properties essentially complying with the above formula will include some special cases with some approximations:

The amplitude filter can be formed by a pure intensity filter which has the same thickness at every point, i.e. Δd(x,y)=0. A phase distribution and in particular a phase difference is not generated. The radiation from the radiation source must not be monochromatic. The transmission degree of such an intensity filter has a distribution according to the $F_{DIC}(x,y)F^*_{DIC}(x,y)$. The phase distribution $P(x,y)$ is set to zero for all points (x,y). Compared to an amplitude filter with phase difference the image is only very little more diffuse despite this approximation.

For the generation of a distribution of the amplitude transmission the amplitude filter can be coated with aluminum or another suitable, absorbing material. Thereby, the distribution of the intensity is suitably influenced. Alternatively, a plate is used which has a varying optical thickness depending on the coordinates x and y.

In a further approximation no phase difference is generated also, i.e. the phase distribution $P(x,y)$ is set to zero for all points (x,y). It is, furthermore, provided that the amplitude filter is a knife-edge in the exit pupil which does not let any intensity pass on one side and blocks the radiation in one part of the exit pupil and lets maximum intensity pass on the other side in the remaining part of the exit pupil, i.e the transmission degree $T(x,y)$ is set to zero in all points for $T(x,y) \le S$ with S being a threshold with $0 \le S \le T_0^2$. Preferably, the knife-edge is arranged in such a way that at least half of the radiation is with maximum intensity passes.

In an alternative embodiment of the invention monochromatic radiation is used and a phase step. The phase can then be set to zero.

It is a common feature of all embodiments that no polarizator and no Nomarski-prism is necessary. Thereby, the light throughput of the optical assembly is much higher than compared to known methods. It is also not necessary to use coherent light or a small illumination aperture. The assembly can be used independently of the kind of light source and independently of the polarization of the light.

The effect of the amplitude filter in the exit pupil can be derived from the following considerations:

Theoretically a differential interference contrast (DIC) can be described as the result of two independent amplitude filters on the optical transmission function in the course of a partially coherent imaging in a microscope. The differential interference contrast is generated in the image space from two perpendicularly polarized and thereby independent bright field illuminators. The radiation is distinguished from each other by their systematic phase gradients in the entrance pupil of the microscope objective. Both phase gradients have the same absolute value, they are "quasi-linear" and have the same direction. The phase gradients, however, have opposite senses of direction, i.e. they have opposite signs. The direction of the phase gradients is set by the direction of the two wedges of the Nomarski-prism in the illumination path.

The first Nomarski-prism is optically in the range of the entrance pupil of the microscope objective but before the object in the imaging chain. Due to the Nomarski-prism two polarization dependent opposite phase gradients are caused along the direction of the wedge of the Nomarski-Prism.

The second Nomarski-Prism is physically arranged in the imaging radiation path in the range of the exit pupil of the microscope objective. Optically it is at the same position as the first Nomarski-prism but behind the object in the imaging chain. However, it is orientated in such a way that it compensates the two polarization dependent phase gradients of the first Nomarski-prism.

Considered from the standpoint of the partially coherent image in the microscope the Köhler illumination generates an almost entirely incoherent substitute light source in the entrance pupil of the microscope objective and such substitute light source is before the object in the imaging chain. The first Nomarski-prism which is also positioned before the object in the imaging chain and which lays in the entrance pupil has, therefore, no effect which is relevant for the image. It can be omitted. The second Nomarski-prism generates the opposite phase gradients in the exit pupil. Each individual amplitude distribution of each wave diffracted by the object belonging to an incoherent point of the substitute light source is impressed on one of the two opposite phase gradients. This is automatically effected depending on the polarization for each incoherent illumination portion. It is sufficient to place a polarizer directly before the second Nomarski-prism in the imaging chain. The polarizer in the illumination radiation path is relevant only for the operation of the first Nomarski-prism and can, therefore, be omitted.

An entirely transparent amplitude filter in the exit pupil of the microscope objective exclusively consisting of a quasi-linear phase gradient causes a lateral shift of the microscope image. The following applies:

$$\frac{P_{max}}{2\pi}\lambda = A \cdot \Delta z$$

wherein $\Delta z$: lateral shift of the image calculated for the object plane in the object plane of the microscope in the direction of the phase gradient.

A: object aperture of the microscope $P_{max}$: phase of the phase gradient having the largest absolute value at the edge of the exit pupil of the microscope The amplitude filter according to the present invention can be derived by means of two quasi-linear, opposite phase gradients $+P_{max}$ and $-P_{max}$, which depend on the polarization. With such an amplitude filter the second Nomarski-prism, its polarizer and its analyzer can be omitted in the imaging path of rays.

The dependency on the polarization of opposite phase gradients $\pm P_{max}$ of the fictive amplitude filter is irrelevant for the differential interference contrast effect itself. Preferably, the polarization properties of the object are also irrelevant with active amplitude filters. The fictive amplitude filters enable the combination with common polarization contrast methods.

The mathematical representation of the fictive polarization independent amplitude filters is effected by means of the fictive amplitude transmission factors $F_+$ and $F_-$, which represent the opposite phase gradients and for which applies in the above notation:

$$F_+(x,y) = T_0 \cdot e^{+iP_{max} \cdot (-x \cdot \sin \phi + y \cdot \cos \phi)}$$

The amplitude transmission factor $T_0$ is real and constant along the exit pupil and is typically between 0 and 1. $\phi$ is the orientation of the phase gradient in the exit pupil and has values between $-\pi$ and $+\pi$. $\phi=0$ means "meridional positive", i.e. $+y$ in the coordinate system in the exit pupil. $\phi=-\pi/2$ means "sagittal positive", i.e. $+x$ in the coordinate system in the exit pupil.

The fictive amplitude transmission factor $F_+$ can be realized in practice by, for example, a coated glass plate in the exit pupil. The glass plate is a phase plate having a transmission degree $F_+ F^*_+$ and a change of thickness $\Delta d_+$ with a distribution which is in the above mentioned notation $$(n-1) \cdot \Delta d_+(x,y) = $$
$$\frac{+P_{max}}{2\pi} \cdot \lambda \cdot (-x \cdot \sin \varphi + y \cdot \cos \varphi) = +A \cdot \Delta z \cdot (-x \cdot \sin \varphi + y \cdot \cos \varphi)$$

If an opposite phase plate is added in the exit pupil to the phase plate described by the equation above, the overall effect of the amplitude filter is:

$$F_+(x,y) \cdot F_-(x,y) = T_0 \cdot e^{+iP_{max}(-x \sin \phi + y \cos \phi)} \cdot$$
$$T_0 \cdot e^{-iP_{max}(-x \sin \phi + y \cos \phi)} = T_0^2$$

In other words: a paired, opposite shift is not effected. There is no lateral shift at all, since the light is not allocated to the two halves of the phase plate.

The claimed amplitude filter which technically cannot be put into practice with the property $$2 \cdot F_{DIC}(x,y) = F_+(x,y) \cdot e^{+iP_0} + F_-(x,y) =$$
$$2 \cdot T_0 \cdot \cos\left(P_{max}(-x \cdot \sin \varphi + y \cdot \cos \varphi) + \frac{P_0}{2}\right) \cdot e^{+i\frac{P_0}{2}}$$

separates the light into two portions and thereby generates the desired paired lateral shift which is necessary for the generation of a differential interference contrast. It is important, that the effect of the assembled amplitude filter $F_{DIC}(x,y)$ has an added up distribution of the amplitude transmission factor with an added-up distribution of the phase. The combined effect of the fictive amplitude filter pair $F_+$, $F_-$ can be distributed on an intensity filter which can be technically put into practice and a phase plate which can also be technically put into practice, by expressing the amplitude filter in the form of a complex product of a transmission degree $T(x,y)$ and a phase $P(x,y)$. $T(x,y)$ and $P(x,y)$ must have the same effect as $F_{DIC}(x,y)$ on the complex light amplitudes and this can be effected in an unambiguous way only if a possibly negative amplitude transmission factor $$F_{DIC}(x,z) = t(x,z) \cdot e^{i\frac{P_0}{2}}$$

at (x,y) is replaced by a non-negative amplitude transmission factor $F_{DIC}(x,z) = \sqrt{T(x,z)} \cdot e^{iP(x,z)}$ and an additional phase $\pi$ with $P(x,y)=P_0/2+\pi$ is added to the phase $P_0/2$; in such a way the amplitude transmission factor can be unambiguously expressed in the form of an optical density. The possibly modified phase $P(x,y)$ in return can be expressed by a variation of the thickness of the glass plate of the filter substrate.

Any distribution $I_T(x,y)=I_0 \cdot T(x,y)$ can be used for the distribution of the Transmission degree $I_T(x,y)$ of the amplitude filter $F_{DIC}(x,y)$, where $0<I_0$ is a random scaling factor.

The following equation applies to the phase plate representing the possibly modified phase $P(x,y)$:

$$e^{iP(x,y)} = \frac{F_{DIC}}{\sqrt{T(x,y)}}.$$

The described assembly differs from a Foucault knife-edge. The Foucault knife-edge is placed in the image plane or in an intermediate image plane of an objective. The DIC knife-edge is in the exit pupil or in a pupil of an objective. Ideally, a point object is used with a Foucault knife-edge. The extension of the object should at least be in the order of an airy disc (1.22·λ/A). The DIC knife-edge is only useful when applied to extended objects. It does not make sense for point-like objects. The Foucault knife-edge is used for intensity objects and is not useful for phase objects. The DIC knife-edge is particularly advantageous with pure phase objects.

Further modifications of the present invention are subject matter of the subclaims. Embodiments are described below in greater details with reference to the accompanying drawings.

BRIEF DESCRIPTION OF THE DRAWINGS

FIG. 6 is a profile section of an amplitude filter and shows the real portion of $F_{DIC}$ according to FIG. 4a.

DESCRIPTION OF THE EMBODIMENTS

Figure 1:
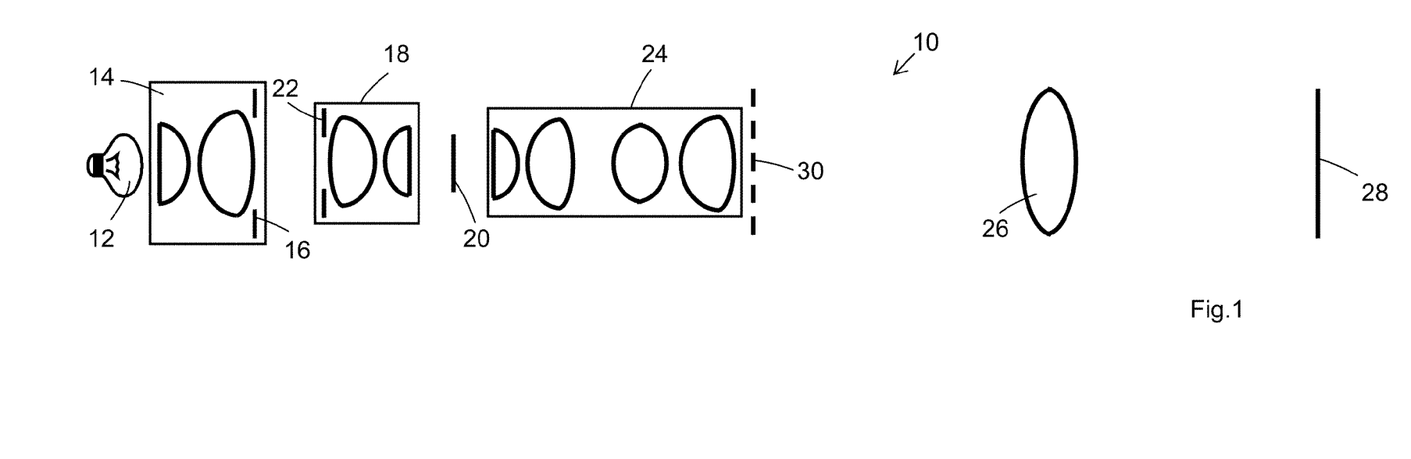
FIG. 1 is a schematic representation of the components of a transmission light microscope for the generation of a differential interference contrast image.

FIG. 1 shows a transmission microscope for the generation of a differential interference contrast image which is generally designated with numeral 10. The microscope 10 is provided with a lamp 12 as radiation source. A collector 14 with a lens assembly and a luminous field stop 16 is arranged before the lamp 12 in the luminous field stop plane. The illumination assembly of the microscope 10 is furthermore provided with a condensor 18 with a lens assembly and an illumination aperture stop 22. The collector 14 and the condensor 18 are arranged in such a way that the object 20 in the object plane is illuminated with a Köhler illumination. Thereby, the luminous field stop plane is imaged with the condensor 18 into the object plane. This can be recognized easily in the light path shown in FIG. 2. The object plane is evenly illuminated even with an unevenly emitting radiation source.

Figure 2:
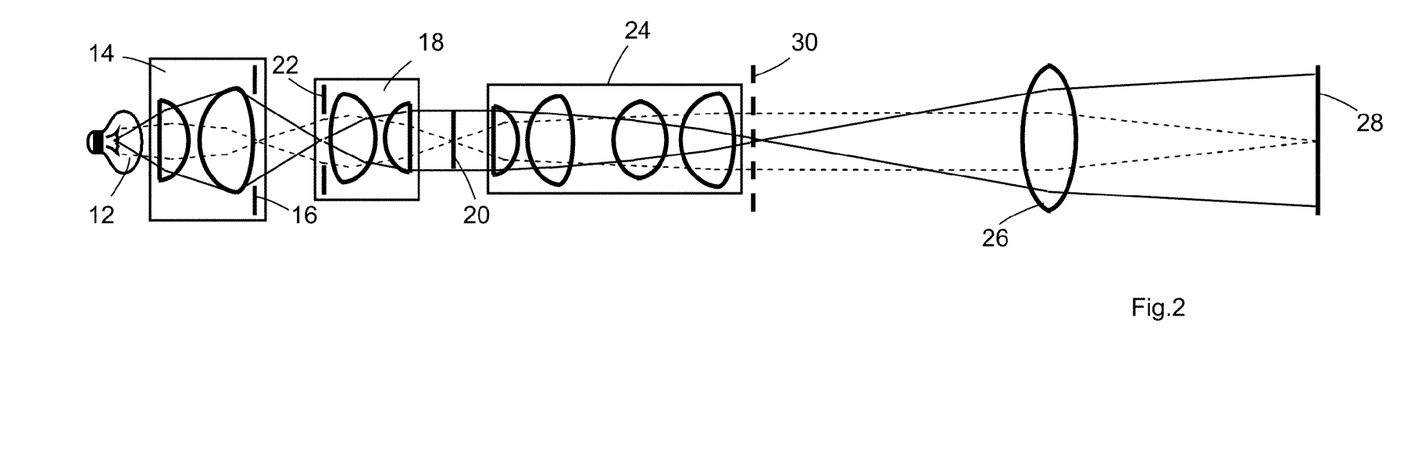
FIG. 2 schematically shows the light path in an assembly of FIG. 1.

The object 20 positioned in the object plane is imaged to the image plane 28 in the usual way using an objective 24 with a suitable objective lens assembly and a tube lens 26. As can be seen in FIG. 2 the optical assembly is designed in such a way that the illumination aperture plane 22 is imaged to the exit pupil plane 30 of the objective 24.

The above described assembly is well known in the art and corresponds to the usual microscope assemblies. Contrary to known microscopes, however, an amplitude filter is positioned in the exit pupil plane. The amplitude filter is essentially a thin glass plate with varying thickness. The glass plate is coated with aluminum. The aluminum layer is not even. Thereby a intensity transmission distribution is generated which corresponds to the thickness of the layer.

The glass plate in the exit plane 30 essentially complies with the following condition:

$$2 \cdot F_{DIC}(x,y) = F_+(x,y) \cdot e^{+iP_0} + F_-(x,y) =$$
$$2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein x,y: coordinates in the exit pupil plane $F_{DIC}(x,y)$: functional expression for describing the amplitude filter transmission and the phase of the amplitude filter as a function of x and y t(x,y): variable, real portion of the amplitude transmission factor of the amplitude filter with $$t(x,y) = T_0 \cdot \cos\left(P_{max}(-x \cdot \sin\varphi + y \cdot \cos\varphi) + \frac{P_0}{2}\right)$$

T(x,y): Transmission degree of the amplitude filter. If $F^*_{DIC}(x,y)$ designates the conjugate-complex of $F_{DIC}(x,y)$, then $$T(x,y) = F_{DIC}(x,y) \cdot F^*_{DIC}(x,y) = t^2(x,y)$$

$F_+(x,y)$: "positive" portion of $F_{DIC}$, with $F_+(x,y) = T_0 \cdot e^{iP_{max}(-x \cdot \sin\phi + y \cdot \cos\phi)}$ φ: azimuth direction angle of the effect of the DIC in the exit pupil plane P(x,y): phase distribution of the amplitude filter with $$P(x,y) = \arg(F_{DIC}) = \begin{cases} \dfrac{P_0}{2} & -\pi \le 2P_{max} \cdot (-x \cdot \sin\varphi + y \cdot \cos\varphi) + P_0 \le \pi \\ \dfrac{P_0}{2} + \pi & \pi \le 2P_{max} \cdot (-x \cdot \sin\varphi + y \cdot \cos\varphi) + P_0 \le 3\pi \end{cases}$$

$F_-(x,y)$: "negative" portion of $F_{DIC}$, with $$F_+(x,y) \cdot F_-(x,y) = T_0 \cdot e^{+iP_{max}(-x \cdot \sin\phi + y \cdot \cos\phi)} \cdot T_0 \cdot e^{-iP_{max}(-x \cdot \sin\phi + y \cdot \cos\phi)} = T_0^2$$

$P_0$: constant, real phase offset of the amplitude filter $F_{DIC}(x,y)$ $T_0$: constant, real amplitude transmission factor of $F_{DIC}$; or $F_+$ and $F_-$, resp.

$P_{max}$: constant, real maximum phase of $F_+$ or $F_-$, resp.

The thickness of the glass plate has a distribution where the deviation $\Delta d$ from a base thickness corresponds to:

$$\Delta d(x, y) = \frac{\lambda}{2\pi \cdot (n-1)} \cdot \arg\left(\frac{F_{DIC}(x, y)}{\sqrt{T(x, y)}}\right)$$

Figure 4A:
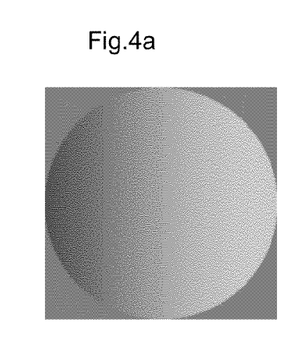
FIG. 4a-d shows the properties of an example with an amplitude filter.
Figure 4B:
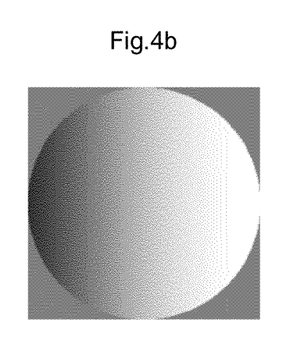
Figure 4C:
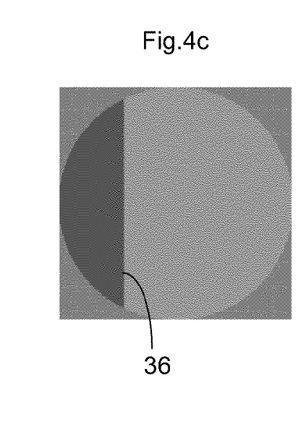
Figure 8:
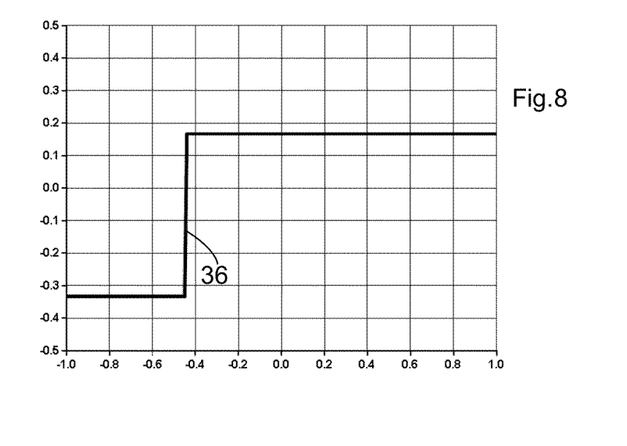
FIG. 8 is a profile section of an amplitude filter and shows the phase/$2\pi$ of $F_{DIC}$ according to FIG. 4c.

Thereby a phase is generated which is shown by way of example in FIG. 4c. A profile section of the phase along the cutting line 34 (FIG. 4d) is shown in FIG. 8. It can be seen that the thickness of the glass plate escalates at 36.

Figure 4D:
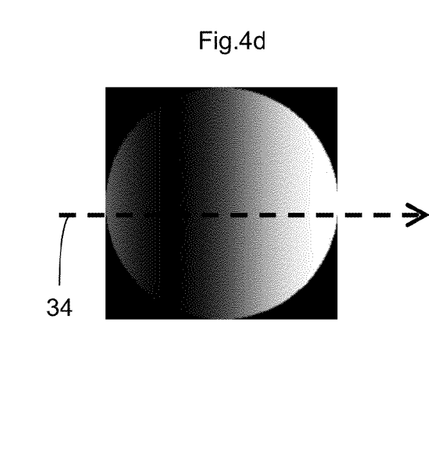
Figure 6:
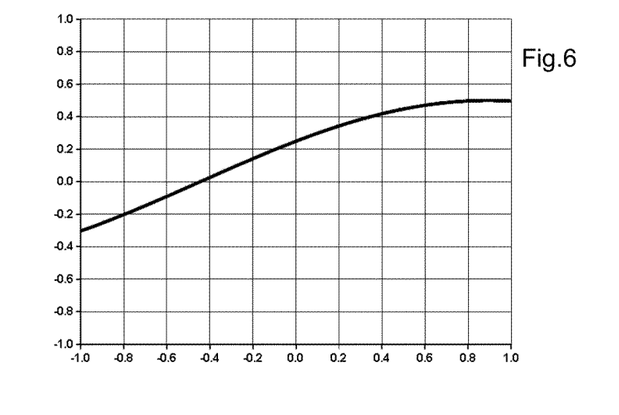
Figure 7:
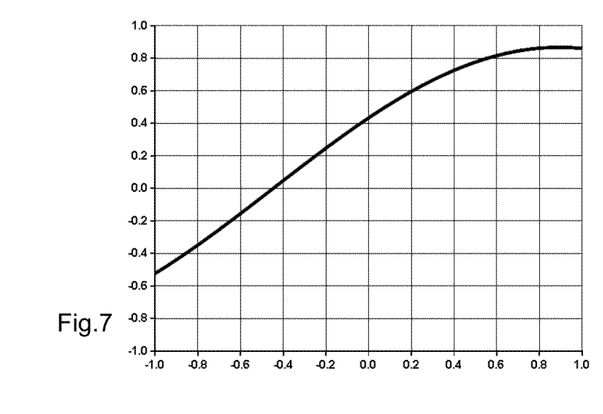
FIG. 7 is a profile section of an amplitude filter and shows the imaginary portion of $F_{DIC}$ according to FIG. 4b.
Figure 9:
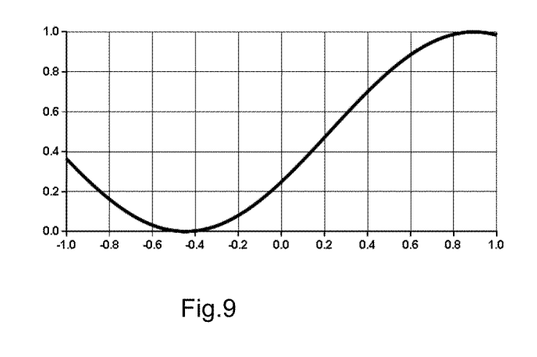
FIG. 9 is a profile section of an amplitude filter and shows the transmission degree of $F_{DIC}$ as the square of the absolute value ($F_{DIC}*F_{DIC}$).

FIG. 4a shows the real portion of the above amplitude function $F_{DIC}$ and FIG. 4b shows the imaginary portion. The corresponding profile sections are shown in FIGS. 6 and 7. The transmission degree $T(x, y)$ resulting from such distributions is shown in FIG. 4d and FIG. 9. The distribution of the intensity transmission is put into practice with an aluminum coating.

Figure 5:
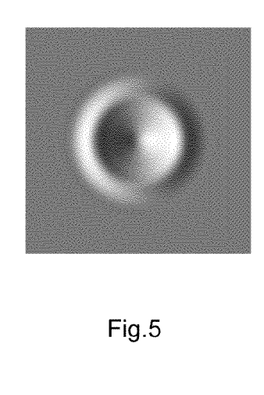
FIG. 5 is an image of a pure phase object generated with the amplitude filter of FIG. 1.

The amplitude filter having such a shape for the generation of a phase gradient which is a function of the position and such a coating for the generation of an intensity transmission which is a function of the position can generate a differential interference contrast image. An example of such an image of a phase object is shown by way of example in FIG. 5.

Figure 3:
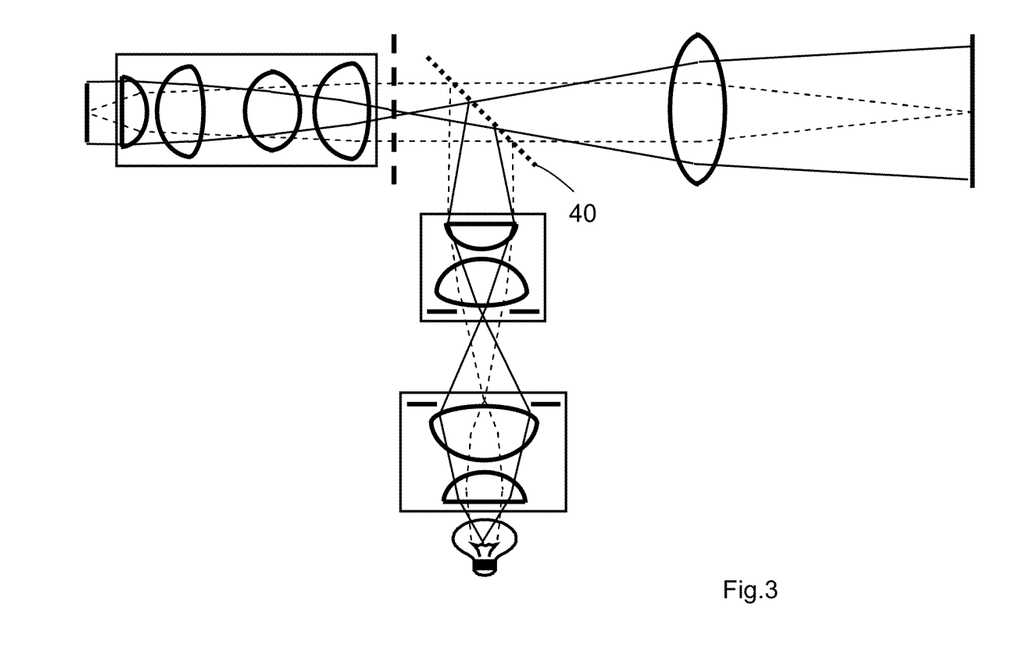
FIG. 3 is a schematic representation of the components and the light path in an reflecting light microscope for the generation of a differential interference contrast image similar to FIG. 1.

It is also possible to use a reflecting light microscope instead of a transmitting light microscope as schematically shown in FIG. 3. The amplitude filter is here also arranged in the exit pupil plane of the objective. The launching of the illumination from the side is effected by means of a semi-transparent mirror 40 in the light path between the objective and the lens tube.

The invention can be put into practice with an integrated amplitude filter where the intensity transmission profile and the phase variation is effected in one glass plate. It is, however, also possible to use a filter with the intensity transmission profile and a separate phase plate.

It was found, that very good imaging results were achieved and a DIC typical image was achieved even if only a phase plate or only a filter with the transmission profile was used. These components generate a shift between two images even if they are used by themselves. The phase formula uses one of the two fictive filters in such case, for example F+, and is then $P(x,y)=\pm abs(arg(F_+))+Offset$ and $T(x,y)=const$, wherein either of the two signs "±" may be used. The offset, $P_{max}$ and the rotation about the optical axis determine the appearance of the image. The offset can be easily varied by shifting the filter in a direction lateral to the optical axis. The distribution $P(x,y)$ must not be linear, more important is the "±abs", i.e. the existence of a minimum or a maximum within the exit pupil depending on the chosen sign. In a particularly easy embodiment of the invention only a simple knife-edge is used. This means that the filter transmits at one side of the edge no and on the other side of the edge the entire intensity. Even with this embodiment only small compromises regarding the imaging quality must be made. The more outside the edge is arranged the more light will fall on the detector in the imaging plane. However, the imaging quality is reduced.

The invention claimed is:

1. An assembly for the generation of a differential interference contrast image (DIC) of an object provided in an object plane in an imaging plane, comprising:

(a) a light emitting radiation source;
(b) a Köhler illuminating optical assembly for illuminating said object with said light from said radiation source, said Köhler illuminating optical assembly having an illuminating pupil;
(c) an objective for imaging an object plane in an imaging plane, wherein said objective is provided with an exit pupil and an entrance pupil, and wherein said entrance pupil of said objective is positioned in said illuminating pupil of said Köhler illuminating optical assembly; and
(d) a component for the generation of an interference of light waves;

characterized in that (e) said component for the generation of said interference of light waves is positioned in said exit pupil of said objective, and
(f) said component for the generation of said interference of light waves is formed by an amplitude filter with an amplitude transmission factor $F_{DIC}(x,y)$, which complies with the equation:

$$2 \cdot F_{DIC}(x, y) = F_+(x, y) \cdot e^{+iP_0} + F_-(x, y) = 2 \cdot T_0 \cdot \cos\left(P_{max}(-x \cdot \sin\varphi + y \cdot \cos\varphi) + \frac{P_0}{2}\right) \cdot e^{+i\frac{P_0}{2}}$$

wherein x,y: coordinates in said exit pupil plane $F_{DIC}(x,y)$: functional expression for describing said amplitude filter transmission and a phase of said amplitude filter as a function of x and y $t(x,y)$: variable, real portion of said amplitude transmission factor of said amplitude filter with $$t(x, y) = T_0 \cdot \cos\left(P_{max}(-x \cdot \sin\varphi + y \cdot \cos\varphi) + \frac{P_0}{2}\right)$$

$T(x,y)$: Transmission degree of said amplitude filter (if $F^*_{DIC}(x,y)$ designates the conjugate-complex of $F_{DIC}(x,y)$, then $T(x,y)=F_{DIC}(x,y) \cdot F^*_{DIC}(x,y)=t^2(x,y)$ $F_+(x,y)$: "positive" portion of $F_{DIC}$, with $F_+(x,y)=T_0 \cdot e^{+iP_{max}(-x \cdot \sin\phi + y \cdot \cos\phi)}$ $\phi$: azimuth direction angle of the effect of the DIC in said exit pupil plane $P(x,y)$: phase distribution of said amplitude filter with $$P(x, y) = \arg(F_{DIC}) = \begin{cases} \frac{P_0}{2} & -\pi \leq 2P_{max} \cdot (-x \cdot \sin\varphi + y \cdot \cos\varphi) + P_0 \leq \pi \\ \frac{P_0}{2} + \pi & \pi \leq 2P_{max} \cdot (-x \cdot \sin\varphi + y \cdot \cos\varphi) + P_0 \leq 3\pi \end{cases}$$

$F_-(x,y)$: "negative" portion of $F_{DIC}$, with $F_+(x,y) \cdot F_-(x,y) = T_0 \cdot e^{+iP_{max}(-x \cdot \sin\phi + y \cdot \cos\phi)} \cdot T_0 \cdot e^{-iP_{max}(-x \cdot \sin\phi + y \cdot \cos\phi)} = T_0^2$ $P_0$: constant, real phase offset of said amplitude filter $F_{DIC}(x,y)$ $T_0$: constant, real amplitude transmission factor of $F_{DIC}$, or $F_+$ and $F_-$, respectively $P_{max}$: constant, real maximum phase of $F_+$ or $F_-$, respectively.

2. The assembly of claim 1, wherein said amplitude filter is an intensity filter comprising a substrate having a substrate thickness and wherein said substrate has the same substrate thickness in every point.

3. The assembly of claim 1, wherein said amplitude filter generates an amplitude transmission distribution, and wherein said amplitude filter is coated with aluminum or any other suitable absorbing material.

4. The assembly of claim 1, wherein said amplitude filter is provided with a knife-edge extending in said exit pupil, which does not let any radiation from said radiation source pass on one side and blocks said radiation in a portion of said exit pupil and which lets the maximum intensity of said radiation pass on the other side in the remaining portion of the exit pupil.

5. The assembly of claim 4, wherein said knife-edge is positioned in such a way that at least half of said radiation passes with maximum intensity.

6. The assembly of claim 1, wherein the zero diffraction order of the light diffracted by the object passes with maximum intensity.

* * * * *